US011206399B2

(12) United States Patent
Wang et al.

(10) Patent No.: US 11,206,399 B2
(45) Date of Patent: Dec. 21, 2021

(54) METHODS, SYSTEMS, DEVICES AND COMPUTER-READABLE MEDIUMS FOR DEBLOCKING FILTER

(71) Applicant: PEKING UNIVERSITY SHENZHEN GRADUATE SCHOOL, Shenzhen (CN)

(72) Inventors: Ronggang Wang, Shenzhen (CN); Zhenyu Wang, Shenzhen (CN); Xi Xie, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 0 days.

(21) Appl. No.: 16/768,377

(22) PCT Filed: Mar. 6, 2019

(86) PCT No.: PCT/CN2019/077151
§ 371 (c)(1),
(2) Date: May 29, 2020

(87) PCT Pub. No.: WO2020/172902
PCT Pub. Date: Sep. 3, 2020

(65) Prior Publication Data
US 2021/0211656 A1    Jul. 8, 2021

(30) Foreign Application Priority Data
Feb. 26, 2019  (CN) .......................... 201910141512.2

(51) Int. Cl.
*H04N 7/18*    (2006.01)
*H04N 19/117*    (2014.01)
(Continued)

(52) U.S. Cl.
CPC ......... *H04N 19/117* (2014.11); *H04N 19/105* (2014.11); *H04N 19/124* (2014.11);
(Continued)

(58) Field of Classification Search
CPC .... H04N 19/117; H04N 19/105; H04N 19/52; H04N 19/124; H04N 19/182
(Continued)

(56) References Cited

U.S. PATENT DOCUMENTS 8,705,576 B2    4/2014  Shim et al.
2012/0287994 A1*  11/2012  Van der Auwera .. H04N 19/176
375/240.12
(Continued)

FOREIGN PATENT DOCUMENTS

| CN | 101472175 A | 7/2009 |
| CN | 102196258 A | 9/2011 |
| WO | 2008084996 A1 | 7/2008 |

OTHER PUBLICATIONS

International Search Report dated Oct. 28, 2019 for corresponding PCT Application No. PCT/CN2019/077151.

*Primary Examiner* — Shan E Elahi
(74) *Attorney, Agent, or Firm* — Miles & Stockbridge P.C.

(57) ABSTRACT

The present application provides methods, systems, devices and computer-readable mediums for deblocking filter. A method of the present application comprises: determining a filtering boundary, and then determining a filter pixel group based on the filtering boundary; determining a filter strength of the filter pixel group, comprising: parsing separately a pixel value difference states of pixel points on both sides of the filtering boundary in the filter pixel group to obtain two one-sided flatness FL and FR; calculating a comprehensive flatness FS of the filter pixel group, wherein FS=FL+FR; calculating the filter strength according to FS; filtering
(Continued)

calculation of pixel points included in the filter pixel group according to the filter strength. Compared with the prior art, the method of the embodiment of the present invention fully considers the pixel value change state of the pixel points on both sides of the filtering boundary, so that a more reasonable filter strength judgment condition is adopted when determining the filter strength of the filter pixel group, thereby finally obtaining a more realistic deblocking filter result.

21 Claims, 5 Drawing Sheets

(51) Int. Cl.
*H04N 19/105* (2014.01)
*H04N 19/124* (2014.01)
*H04N 19/182* (2014.01)
*H04N 19/52* (2014.01)
*H04N 19/86* (2014.01)

(52) U.S. Cl.
CPC ........... *H04N 19/182* (2014.11); *H04N 19/52* (2014.11); *H04N 19/86* (2014.11)

(58) Field of Classification Search
USPC ...................................... 375/240.29
See application file for complete search history.

(56) References Cited

U.S. PATENT DOCUMENTS

| | | | |
|---|---|---|---|
| 2015/0003521 A1* | 1/2015 | Thirumalai | H04N 19/597 375/240.08 |
| 2017/0094283 A1* | 3/2017 | Zhang | H04N 19/147 |
| 2018/0103252 A1* | 4/2018 | Hsieh | H04N 19/176 |

* cited by examiner

METHODS, SYSTEMS, DEVICES AND COMPUTER-READABLE MEDIUMS FOR DEBLOCKING FILTER

CROSS-REFERENCE TO RELATED APPLICATIONS

This application is a national stage filing under 35 U.S.C. § 371 of PCT/CN2019/077151, filed on Mar. 6, 2019 which claims priority to CN Application No. 201910141512.2 filed on Feb. 26, 2019. The applications are incorporated herein by reference in their entirety.

FIELD

The specification relates to an area of computer technology, specifically, relates to methods, systems, devices and computer-readable mediums for deblocking filter.

BACKGROUND

Deblocking filter is a basic tool in the field of video encoding and decoding, which can eliminate or reduce the blockiness of image blocks due to quantization distortion.

The deblocking filter usually uses the boundary of the coding unit image block, the prediction unit image block, and the transform unit image block as the filtering boundary, and performs filtering processing on the pixels on both sides of the filtering boundary. As shown in FIG. 1 and FIG. 2, In the application scenario, one square represents one pixel, 100 is a vertical filtering boundary, and 200 is a horizontal filtering boundary. A plurality of consecutive pixels located on the same row or the same column on both sides of the filtering boundary constitute a filter pixel group. For example, a group of pixels circled by a dotted line 101 or 201 is called a filter pixel group. Deblocking filter means to perform deblocking filtering on the pixel groups for filtering.

When deblocking filter is performed, the filter strength and the filter are usually first determined, and then the pixels in the filter pixel group are filtered and calculated according to the determined filter strength and the filter to obtain a new pixel value. However, in the prior art, since the judgment conditions for determining the filter strength and the filter are not designed properly, to cause the boundary that should be filtered has no filtering or insufficient filter strength, or the boundary that should not be filtered is filtered. As a result, the deblocking filter cannot achieve the expected effect, which ultimately leads to a decline in the subjective quality and objective quality of the picture.

SUMMARY

In view of this, embodiments of the present specification provide methods, systems, devices and computer-readable mediums for deblocking filter, it is used to improve the problem that the deblocking filter in the prior art cannot achieve the is expected effect.

Embodiments of the present specification provide the following technical solutions:

an embodiment of the present specification provides a method for deblocking filter, comprising:
determining a filtering boundary, and then determining a filter pixel group based on the filtering boundary;
determining a filter strength of the filter pixel group, comprising: a calculating step, the calculating step comprising:
parsing separately a pixel value difference states of pixel points on both sides of the filtering boundary in the filter pixel group to obtain two one-sided flatness FL and FR;
calculating a comprehensive flatness FS of the filter pixel group, wherein FS=FL+FR;
calculating the filter strength according to FS;
filtering calculation of pixel points included in the filter pixel group according to the filter strength.

In one embodiment:
when determining the filter pixel group, the filter pixel group including at least consecutively arranged pixel points P2, P1, P0, Q0, Q1, and Q2, wherein pixel values are respectively p2, p1, p0, q0, q1, and q2, and the filtering boundary passes through between pixel points of P0 and Q0;
obtaining two one-sided flatness FL and FR, comprising:
calculating an average quantization parameter according to a quantization parameter of an encoding unit where P0 and Q0 are located, calculating thresholds A and B according to the average quantization parameter, and initializing FL and FR to 0, respectively Calculate FL and FR, where:
if abs(p0−p1)<B, the value of FL is increased by 2;
if abs(q0−q1)<B, the value of FR is increased by 2;
if abs(p0−p2)<B, the value of FL is increased by 1;
if abs(q0−q2)<B, the value of FR is increased by 1;
calculating the filter strength according to FS, wherein:
when FS is 6, if abs(p0−p1)≤B/4, and abs(q0−q1)≤B/4, and abs(p0−q0)<A, the filter strength is 4, otherwise 3;
when FS is 5, if p0 is equal to p1, and q0 is equal to q1, the filter strength is 3, otherwise 2;
when FS is 4, if the value of FL is 2, the filter strength BS is 2, otherwise it is 1;
when FS is 3, if abs(p1−q1)<B, the filter strength is 1, otherwise 0;
when FS is other than 3~6, the filter strength is 0.

In one embodiment, wherein calculating thresholds A and B based on the average quantization parameter, comprising:
obtaining initial values of the thresholds A and B according to the average quantization parameter query based on the preset table;
the initial values of a thresholds A and B are adjusted according to a pixel value bit width, and the final values of a thresholds A and B are obtained.

In one embodiment:
the initial values of the thresholds A and B are adjusted according to the pixel value bit width, wherein the initial value is adjusted based on the following formula:

$A=A<<(B-8);$ $B=B<<(BD-8);$ in the above formula, BD is the pixel value bit width.

In one embodiment:
when determining the filter pixel group, the filter pixel group including at least consecutively arranged pixel points P3, P2, P1, P0, Q0, Q1, Q2, and Q3, wherein pixel values are respectively p3, p2, p1, p0, q0, q1, q2, and q3, and the filtering boundary passes through between two pixel points of P0 and Q0;
when filtering calculation of pixel points included in the filter pixel group according to the filter strength, if the filtering boundary is a luminance block boundary and the filter strength is 4, the filtering calculation is performed based on the following formula:

$p0'=(p2*3+p1*8+p0*10+q0*8+q1*3+16)>>5;$ $$q0'=(q2*3+q1*8+q0*10+p0*8+p1*3+16)>>5;$$

$$p1'=(p2*4+p1*5+p0*4+q0*3+8)>>4;$$

$$q1'=(q2*4+q1*5+q0*4+p0*3+8)>>4;$$

$$p2'=(p3*2+p2*2+p1*2+p0+q0+4)>>3;$$

$$q2'=(q3*2+q2*2+q1*2+q0+p0+4)>>3;$$

in the above formula, p2', p1', p0', q0', q1', q2' represent new pixel values respectively, which obtained by filtering calculations of P2, P1, P0, Q0, Q1, and Q2 pixel points.

In one embodiment:
when determining the filter pixel group, the filter pixel group including at least consecutively arranged pixel points P2, P1, P0, Q0, Q1, Q2, wherein pixel values are respectively p2, p1, p0, q0, q1, q2, and the filtering boundary passes through between pixel points of P0 and Q0;
when filtering calculation of pixel points included in the filter pixel group according to the filter strength, if the filtering boundary is a luminance block is boundary and the filter strength is 3, the filtering calculation is performed based on the following formula:

$$p0'=(p2+p1*4+p0*6+q0*4+q1+8)>>4;$$

$$q0'=(q2+q1*4+q0*6+p0*4+p1+8)>>4;$$

$$p1'=(p2*3+p1*8+p0*4+q0*1+8)>>4;$$

$$q1'=(q2*3+q1*8+q0*4+p0*1+8)>>4;$$

in the above formula, p1', p0', q0', q1' represent new pixel values respectively, which obtained by filtering calculations of P1, P0, Q0, Q1 pixel points respectively.

In one embodiment:
when determining the filter pixel group, the filter pixel group including at least consecutively arranged pixel points P1, P0, Q0, Q1, wherein pixel values are respectively p1, p0, q0, q1, and the filtering boundary passes through between pixel points of P0 and Q0;
when filtering calculation of pixel points included in the filter pixel group according to the filter strength, if the filtering boundary is a luminance block boundary and the filter strength is 2, the filtering calculation is performed based on the following formula:

$$p0'=(p1*3+p0*10+q0*3+8)>>4;$$

$$q0'=(q1*3+q0*10+p0*3+8)>>4;$$

in the above formula, p0', q0' represent new pixel values respectively, which obtained by filtering calculations of P0, Q0 pixel points respectively.

In one embodiment:
is when determining the filter pixel group, the filter pixel group including at least consecutively arranged pixel points P0, Q0, wherein pixel values are respectively p0, q0, and the filtering boundary passes through between pixel points of P0 and Q0;
when filtering calculation of pixel points included in the filter pixel group according to the filter strength, if the filtering boundary is a luminance block boundary and the filter strength is 1, the filtering calculation is performed based on the following formula:

$$p0'=(p0*3+q0+2)>>2;$$

$$q0'=(q0*3+p0+2)>>2;$$

in the above formula, p0', q0' represent new pixel values respectively, which obtained by filtering calculations of P0, Q0 pixel points respectively.

In one embodiment, calculating the filter strength further comprising:
when the filtering boundary is a chroma block boundary and the filter strength calculated in the step of calculating the filter strength according to the FS is not 0, the filter strength calculated in the step of calculating the filter strength according to the FS is decremented by one, as a final filter strength calculation result.

In one embodiment:
when determining the filter pixel group, the filter pixel group including at least consecutively arranged pixel points P1, P0, Q0, Q1, wherein pixel values are respectively p1, p0, q0, q1, and the filtering boundary passes through between pixel points of P0 and Q0;
when filtering calculation of pixel points included in the filter pixel group according to the filter strength, if the filtering boundary is a chroma block boundary and the filter strength is not 0, the filtering calculation is performed based on the is following formula:

$$p0'=(p1*3+p0*10+q0*3+8)>>4;$$

$$q0'=(q1*3+q0*10+p0*3+8)>>4;$$

in the above formula, p0', q0' represent new pixel values respectively, which obtained by filtering calculations of P0, Q0 pixel points respectively.

In one embodiment:
when determining the filter pixel group, the filter pixel group including at least consecutively arranged pixel points P2, P1, P0, Q0, Q1, Q2, wherein pixel values are respectively p2, p1, p0, q0, q1, q2, and the filtering boundary passes through between two pixel points of P0 and Q0;
when filtering calculation of pixel points included in the filter pixel group according to the filter strength, if the filtering boundary is a chroma block boundary and the filter strength is 3, the filtering calculation is performed based on the following formula:

$$p1'=(p2*3+p1*8+p0*3+q0*2+8)>>4;$$

$$q1'=(q2*3+q1*8+q0*3+p0*2+8)>>4;$$

in the above formula, p1', q1' represent new pixel values respectively, which obtained by filtering calculations of P1, Q1 pixel points respectively.

In one embodiment, determining the filter strength of the filter pixel group further comprising:
determining whether the filter strength should be set to 0 directly;
Performing the calculation step when the filter strength should not be set to 0.

In one embodiment, determining whether the filter strength should be set to 0 directly, wherein, defining the pixel points adjacent to the filtering boundary in the filter pixel group as P0 and Q0 respectively, determining whether the filter strength is should be set to 0 directly according to the encoding information of the encoding unit or the prediction unit where P0 and Q0 are located.

In one embodiment, determining whether the filter strength should be set to 0 directly according to the encoding information of the encoding unit or the prediction unit where P0 and Q0 are located, among them, the judgment factors comprising:

whether all the quantized blocks of the encoding unit where P0 and Q0 are located are all 0 blocks;

encoding mode of the encoding unit where P0 and Q0 are located;

reference index and reference frame of the inter prediction unit where P0 and Q0 are located;

motion vector of the inter prediction unit where P0 and Q0 are located.

In one embodiment, determining whether the filter strength should be set to 0 directly according to the encoding information of the encoding unit or the prediction unit where P0 and Q0 are located, wherein, when all the following conditions are met, it is determined that the filter strength should be directly set to 0:

all the quantization blocks of the encoding unit where P0 and Q0 are located are all 0 blocks;

the prediction mode of the encoding unit where P0 and Q0 are located is not intra prediction;

the motion of the prediction unit where P0 and Q0 are located is consistent.

In one embodiment, when both conditions a) and b) are satisfied or both conditions c) and d) are satisfied, it is considered that the motion of the prediction unit where P0 and Q0 are located is consistent:

a) the first reference image of the prediction unit where P0 and Q0 are located does not exist, or both of the first reference index values are the same and the is difference of all components of the first motion vector is less than one integer pixel;

b) the second reference image of the prediction unit where P0 and Q0 are located does not exist, or both of the second reference index values are the same and the difference of all components of the second motion vector is less than one integer pixel;

c) the first reference image of the prediction unit where P0 is located and the second reference image of the prediction unit where Q0 is located do not exist, or the same frame and the difference between the first motion vector of the prediction unit where P0 is located and the second motion vector of the prediction unit where Q0 is located are less than one integer pixel;

d) the first reference image of the prediction unit where Q0 is located and the second reference image of the prediction unit where P0 is located are not present, or are the same frame and the first motion vector of the prediction unit where Q0 is located and all components of the second motion vector of the prediction unit where P0 is located the difference is less than one integer pixel.

The present application also proposes a video encoding method, the method comprising:

getting predicted image blocks;

acquiring a first residual image block according to the predicted image block and the original image block;

generating a quantized block for writing a code stream by transforming and quantizing according to the first residual image block;

generating a second residual image block by inverse quantization and inverse transform according to the quantized block;

acquiring a reconstructed image block according to the second residual image is block and the predicted image block;

performing a deblocking filter on the reconstructed image formed by the reconstructed image block by using a method as described in the embodiment of the present specification to obtain a reference image for subsequent frame reference.

The present application also proposes a video decoding method, the method comprising:

parsing the code stream to obtain quantized blocks and prediction information;

obtaining a predicted image block according to the prediction information;

acquiring a residual image block according to the quantized block;

acquiring a reconstructed image block according to the residual image block and the predicted image block;

performing a deblocking filter on the reconstructed image formed by the reconstructed image block by using a method as described in the embodiment of the present specification to obtain a reference image for subsequent frame reference.

The present application also proposes a deblocking filter system, the system comprising:

a filtering boundary determining module, configured to determine a filtering boundary;

a filter pixel group determining module, configured to determine a filter pixel group based on the filtering boundary;

a filter strength determining module, configured to determine a filter strength of the filter pixel group, the filter strength determining module includes a calculating module, and the calculating module includes:

a single-sided flatness calculating unit, configured to respectively parse pixel value difference states of pixel points on both sides of the filtering boundary in the filter pixel group to obtain two one-sided flatness FL and FR;

an integrated flatness calculating unit, configured to calculate an integrated flatness FS of the filter pixel group, wherein FS=FL+FR;

a filter strength calculating unit, configured to calculate the filter strength according to FS;

a filter calculating module, configured to perform filtering calculation on pixel points included in the filter pixel group according to the filter strength.

The application further provides a computer-readable medium with computer readable instructions that can be executed by a processor to perform the method of the embodiments of the present specification.

The application further provides a device used for information processing at the user side, wherein the device includes a memory for storing computer program instructions and a processor for executing program instructions, and the device is triggered to perform the method of the embodiments of the present specification when the computer program instructions are executed by the processor.

At least one of the technical solutions of the embodiments of the present specification above can achieve the following beneficial effects: compared with the prior art, the method of the embodiment of the present invention fully considers the pixel value change state of the pixel points on both sides of the filtering boundary, so that a more reasonable filter strength judgment condition is adopted when determining the filter strength of the filter pixel group, thereby finally obtaining a more realistic deblocking filter result.

BRIEF DESCRIPTION OF THE DRAWINGS

The figures are described herein as a part of the present application to provide further understanding of the present application. The illustrated embodiments of the present application and descriptions thereof are used to explain the present application but not limitations to the application. In the figures.

DETAILED DESCRIPTION OF EMBODIMENTS

In order to make the purpose, technical solutions and advantages of the present application clearer, the technical solutions of the present application will be clearly and completely described in the following with reference to the specific embodiments of the present application and the corresponding drawings. It is apparent that the described embodiments are only parts of the application, but not all of them. Based on the embodiments of the present application, all other embodiments obtained by those skilled in the art without creative efforts are within the scope of the present application.

When deblocking filter is performed, the filter strength and the filter are usually first determined, and then the pixels in the filter pixel group are filtered and calculated according to the determined filter strength and the filter to obtain a new pixel value. However, in the prior art, since the judgment conditions for determining the filter strength and the filter are not designed properly, to cause the boundary that should be filtered has no filtering or insufficient filter strength, or the boundary that should not be filtered is filtered. As a result, the deblocking filter cannot achieve the expected effect, which ultimately leads to a decline in the subjective quality and objective quality of the picture.

In response to the above problems, the present invention proposes a deblocking filter method. In the method of the embodiments of the present specification, Firstly, parse separately the pixel value difference states of the pixel points on both sides of the filtering boundary in the filter pixel group to obtain two one-sided flatness, and then the comprehensive flatness of the filter pixel group is calculated according to the two one-sided flatness, and finally according to the comprehensive flatness calculation filter strength. In the prior art, the method of the embodiment of the present invention fully considers the pixel value change state of the pixel points on both sides of the filtering boundary, so that a more reasonable filter strength judgment condition is adopted when determining the filter strength of the filter pixel group, thereby finally obtaining a more realistic deblocking filter result.

Figure 1:
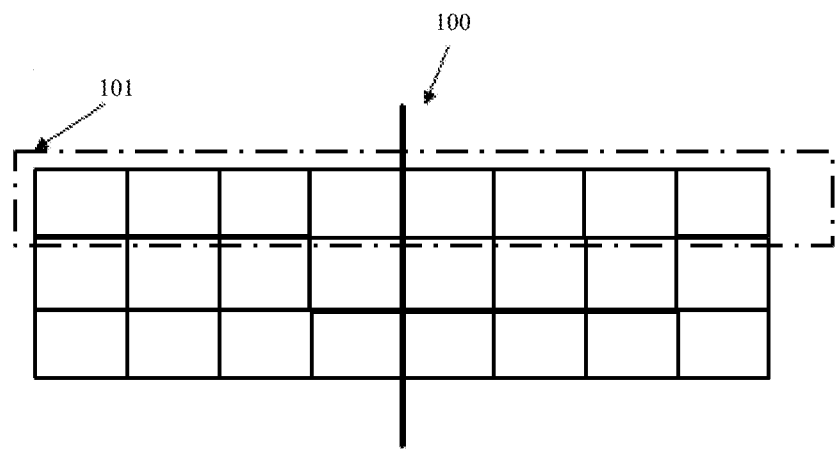
FIGS. 1 and 2 are filter pixel group definition diagram.
Figure 2:
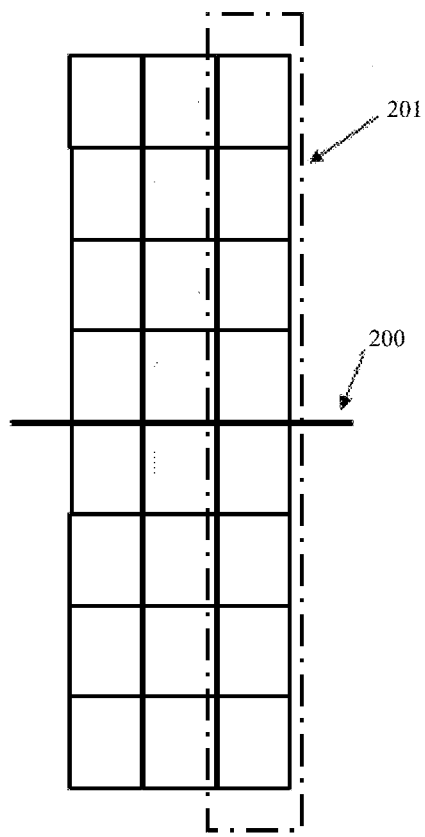
Figure 3:
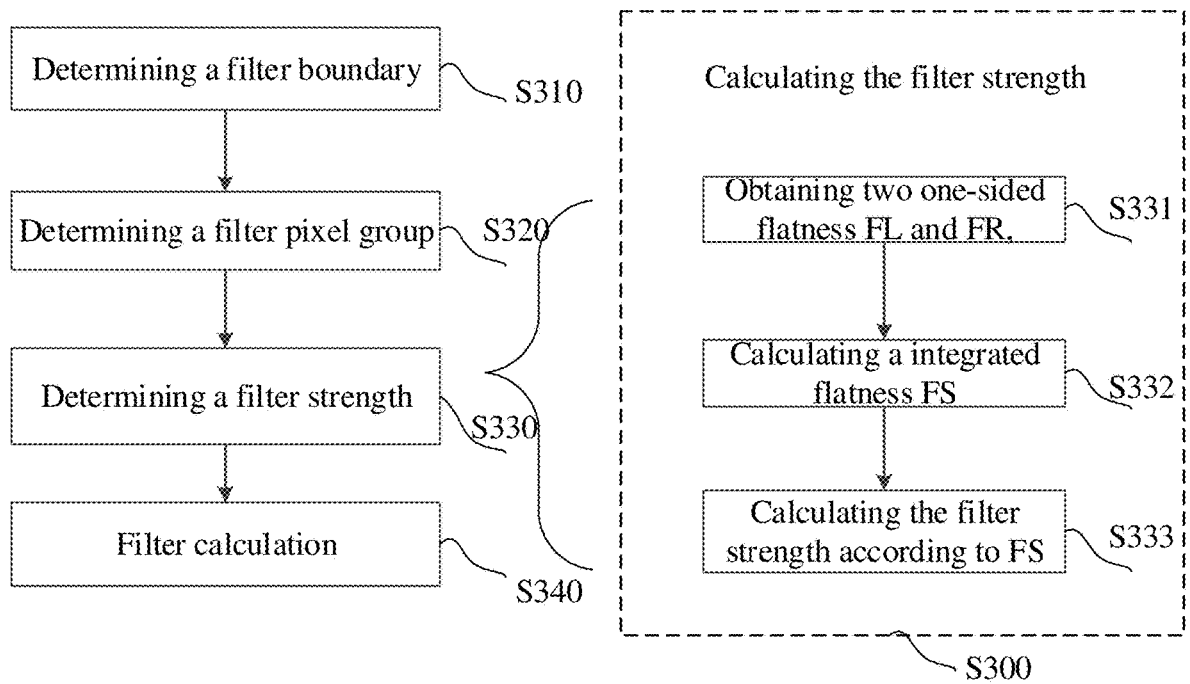
FIGS. 3 and 5 are flowcharts of methods according to embodiments of the present specification.

The technical solutions provided by the embodiments of the present specification are described in detail below with reference to the figures. As shown in FIG. 3, in an embodiment, a method includes the following steps.

S310, determining a filtering boundary;

S320, determining a filter pixel group based on the filtering boundary;

S330, determining a filter strength of the filter pixel group, comprising: a calculating S300, the calculating S300 comprising:

S331, parsing separately a pixel value difference states of pixel points on both sides of the filtering boundary in the filter pixel group to obtain two one-sided flatness FL and FR;

S332, calculating a comprehensive flatness FS of the filter pixel group, wherein FS=FL+FR;

S333, calculating the filter strength according to FS;

S340, filtering calculation of pixel points included in the filter pixel group according to the filter strength.

Specifically, in an embodiment of the present specification, in S310, the filtering boundary satisfies the following conditions: (1) not at the image boundary or strip boundary; (2) is the encoding unit boundary, or the prediction unit boundary, or the transformation unit boundary.

Specifically, in an embodiment, When filtering a plane, first divide the planar image into n×n filter blocks (n is a natural number, in one embodiment, the size of n is the size of the smallest encoding unit (or minimum prediction, transform unit), or an integer multiple thereof), the boundary of each filter block is defined as an alternate filtering boundary. For each boundary in the alternate filtering boundary, remove this boundary from the alternate filtering boundary when the boundary is at the image boundary or strip boundary; if the boundary is neither an encoding unit boundary nor a prediction unit boundary or a transform unit boundary, then the boundary is removed from the candidate filtering boundary; and the remaining candidate filtering boundary is the boundary to be filtered.

Figure 4:
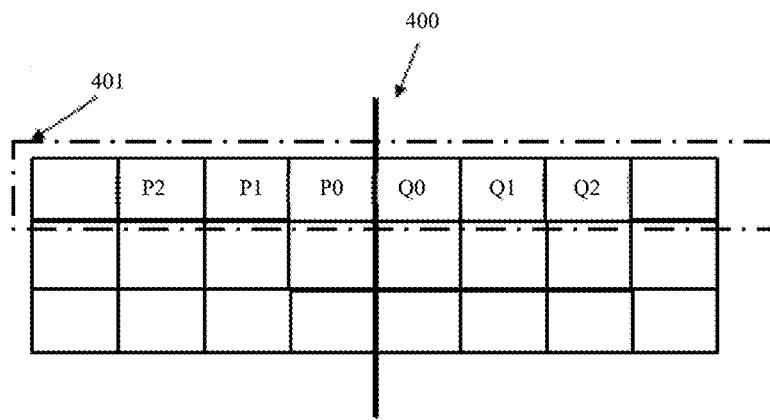
FIG. 4 is a schematic diagram of the definition of a filter pixel group according to an embodiment of the present specification.

Further, in an embodiment of the present specification, in S320, the filter pixel group including at least consecutively arranged pixel points P2, P1, P0, Q0, Q1, and Q2, wherein pixel values are respectively p2, p1, p0, q0, q1, and q2, and the filtering boundary passes through between pixel points of P0 and Q0. As shown in FIG. 4, one square represents one pixel, 400 is a filtering boundary, and one set of pixels circled by a dotted line 401 is a filter pixel group, and the filter pixel group includes at least pixel points P2, P1, P0, Q0, Q1, and Q2.

In S331, calculating an average quantization parameter QPavg according to a quantization parameter of an encoding unit where P0 and Q0 are located, calculating thresholds A and B according to the average quantization parameter QPavg, and initializing FL and FR to 0, respectively Calculate FL and FR, wherein:

if abs(p0−p1)<B, the value of FL is increased by 2;
if abs(q0−q1)<B, the value of FR is increased by 2;
if abs(p0−p2)<B, the value of FL is increased by 1;
if abs(q0−q2)<B, the value of FR is increased by 1;
in S333:
when FS is 6, if abs(p0−p1)≤B/4, and abs(q0−q1)≤B/4, and abs(p0−q0)<A, the filter strength is 4, otherwise 3;
when FS is 5, if p0 is equal to p1, and q0 is equal to q1, the filter strength is 3, otherwise 2;
when FS is 4, if the value of FL is 2, the filter strength BS is 2, otherwise it is 1;
when FS is 3, if abs(p1−q1)<B, the filter strength is 1, otherwise 0;
when FS is other than 3~6, the filter strength is 0.

In the above steps, the function abs(x) is defined as taking the absolute value of x.

Further, in an embodiment of the present specification, in the process of calculating the thresholds A and B from the average quantization parameter QPavg, first, obtaining initial values of the thresholds A and B according to the average quantization parameter query based on the preset table; then the initial values of a thresholds A and B are adjusted according to a pixel value bit width, and the final values of a thresholds A and B are obtained.

Specifically, in an embodiment of the present specification, obtaining initial values of the thresholds A and B according to the average quantization parameter query based on the preset table, which comprising: calculate the index IndexA and IndexB:

$$IndexA = Clip3(0, 63, QPavg - 8 \times (BD-8) + OffsetA)$$

$$IndexB = Clip3(0, 63, QPavg - 8 \times (BD-8) + OffsetB)$$

Among them, BD is the pixel bit width, and OffsetA and OffsetB are the preset is table lookup offsets, according to IndexA and IndexB query Table 1, the initial values of A and B can be obtained.

TABLE 1

| IndexA or IndexB | A | B |
|---|---|---|
| 0 | 0 | 0 |
| 1 | 0 | 0 |
| 2 | 0 | 0 |
| 3 | 0 | 0 |
| 4 | 0 | 0 |
| 5 | 0 | 0 |
| 6 | 0 | 0 |
| 7 | 0 | 0 |
| 8 | 1 | 0 |
| 9 | 1 | 1 |
| 10 | 1 | 1 |
| 11 | 1 | 1 |
| 12 | 1 | 1 |
| 13 | 1 | 1 |
| 14 | 1 | 1 |
| 15 | 1 | 1 |
| 16 | 1 | 1 |
| 17 | 1 | 1 |
| 18 | 1 | 1 |
| 19 | 1 | 1 |
| 20 | 1 | 1 |
| 21 | 2 | 1 |
| 22 | 2 | 2 |
| 23 | 2 | 2 |
| 24 | 2 | 2 |
| 25 | 2 | 2 |
| 26 | 2 | 2 |
| 27 | 3 | 2 |
| 28 | 3 | 3 |
| 29 | 3 | 3 |
| 30 | 3 | 3 |
| 31 | 4 | 3 |
| 32 | 4 | 4 |
| 33 | 4 | 4 |
| 34 | 5 | 5 |
| 35 | 5 | 5 |
| 36 | 6 | 5 |
| 37 | 6 | 6 |
| 38 | 7 | 6 |
| 39 | 7 | 7 |
| 40 | 8 | 8 |
| 41 | 9 | 8 |
| 42 | 10 | 9 |
| 43 | 10 | 10 |
| 44 | 11 | 11 |
| 45 | 12 | 12 |
| 46 | 13 | 13 |
| 47 | 15 | 14 |
| 48 | 16 | 15 |
| 49 | 17 | 16 |
| 50 | 19 | 17 |
| 51 | 21 | 18 |
| 52 | 23 | 19 |
| 53 | 25 | 20 |
| 54 | 27 | 21 |
| 55 | 29 | 22 |
| 56 | 32 | 23 |
| 57 | 35 | 23 |
| 58 | 38 | 24 |
| 59 | 41 | 24 |
| 60 | 45 | 25 |
| 61 | 49 | 25 |
| 62 | 54 | 26 |
| 63 | 59 | 27 |

Specifically, in an embodiment of the present specification, In the process of adjusting the initial values of the thresholds A and B according to the pixel value bit width, the adjustment is made based on the following formula:

$$A = A << (BD-8); \qquad (1)$$

$$B = B << (BD-8); \qquad (2)$$

In equation 1~Form 2, BD is the pixel value bit width. Specifically, in an embodiment, BD is the bit width of the pixel value used for encoding or decoding (Bit Depth).

Further, in an embodiment of the present specification, Different filtering calculation steps (filters) are proposed for different filter strengths. It should be noted that, in some application scenarios, the filter strength may be determined according is to the method proposed in the embodiments of the present specification, and then the deblocking filter calculation is performed according to the specific filtering calculation step proposed in the embodiment of the present specification. The deblocking filter may be calculated according to other filtering calculation steps (specific filtering calculation steps not proposed in the embodiments of the present specification). Similarly, in some application scenarios, the deblocking filter calculation may also be performed according to the specific filtering calculation step proposed in the embodiment of the present specification. After determining the filter strength according to other methods (not the method proposed in the embodiment of the present specification to determine the filter strength).

Further, in the actual application scenario, the objects of the deblocking filter include the luminance plane and the chrominance plane, In the embodiment of the present specification, in order to obtain a better deblocking filter effect, different deblocking filter calculation steps are constructed for the luminance plane and the chrominance plane respectively.

Specifically, in an embodiment of the present specification, the filter pixel group including at least consecutively arranged pixel points P3, P2, P1, P0, Q0, Q1, Q2, and Q3, wherein pixel values are respectively p3, p2, p1, p0, q0, q1, q2, and q3, and the filtering boundary passes through between two pixel points of P0 and Q0. When filtering calculation of pixel points included in the filter pixel group according to the filter strength, if the filtering boundary is a luminance block boundary and the filter strength is 4, the filtering calculation is performed based on the following formula:

$$p0' = (p2*3 + p1*8 + p0*10 + q0*8 + q1*3 + 16) >> 5; \qquad (3)$$

$$q0' = (q2*3 + q1*8 + q0*10 + p0*8 + p1*3 + 16) >> 5; \qquad (4)$$

$$p1' = (p2*4 + p1*5 + p0*4 + q0*3 + 8) >> 4; \qquad (5)$$

$$q1' = (q2*4 + q1*5 + q0*4 + p0*3 + 8) >> 4; \qquad (6)$$

$$p2' = (p3*2 + p2*2 + p1*2 + p0 + q0 + 4) >> 3; \qquad (7)$$

$$q2' = (q3*2 + q2*2 + q1*2 + q0 + p0 + 4) >> 3; \qquad (8)$$

In equation 3~Form 8, p2', p1', p0', q0', q1', q2' represent new pixel values respectively, which obtained by filtering calculations of P2, P1, P0, Q0, Q1, and Q2 pixel points.

Specifically, in an embodiment of the present specification, the filter pixel group including at least consecutively arranged pixel points P2, P1, P0, Q0, Q1, Q2 wherein pixel values are respectively p2, p1, p0, q0, q1, q2, and the filtering boundary passes through between pixel points of P0 and Q0. When filtering calculation of pixel points included in the filter pixel group according to the filter strength, if the filtering boundary is a luminance block boundary and the filter strength is 3, the filtering calculation is performed based on the following formula:

$$p0'=(p2+p1*4+p0*6+q0*4+q1+8)>>4; \qquad (9)$$

$$q0'=(q2+q1*4+q0*6+p0*4+p1+8)>>4; \qquad (10)$$

$$p1'=(p2*3+p1*8+p0*4+q0*1+8)>>4; \qquad (11)$$

$$q1'=(q2*3+q1*8+q0*4+p0*1+8)>>4; \qquad (12)$$

In equation 9~Form 12, p1', p0', q0', q1' represent new pixel values respectively, which obtained by filtering calculations of P1, P0, Q0, Q1 pixel points respectively.

Specifically, in an embodiment of the present specification, the filter pixel group including at least consecutively arranged pixel points P1, P0, Q0, Q1 wherein pixel values are respectively p1, p0, q0, q1, and the filtering boundary passes through is between pixel points of P0 and Q0. When filtering calculation of pixel points included in the filter pixel group according to the filter strength, if the filtering boundary is a luminance block boundary and the filter strength is 2, the filtering calculation is performed based on the following formula:

$$p0'=(p1*3+p0*10+q0*3+8)>>4; \qquad (13)$$

$$q0'=(q1*3+q0*10+p0*3+8)>>4; \qquad (14)$$

In equation 13~Form14, p0', q0' represent new pixel values respectively, which obtained by filtering calculations of P0, Q0 pixel points respectively.

Specifically, in an embodiment of the present specification, the filter pixel group including at least consecutively arranged pixel points P0, Q0, wherein pixel values are respectively p0, q0, and the filtering boundary passes through between pixel points of P0 and Q0. When filtering calculation of pixel points included in the filter pixel group according to the filter strength, if the filtering boundary is a luminance block boundary and the filter strength is 1, the filtering calculation is performed based on the following formula:

$$p0'=(p0*3+q0+2)>>2; \qquad (15)$$

$$q0'=(q0*3+p0+2)>>2; \qquad (16)$$

In equation 15~Form16, p0', q0' represent new pixel values respectively, which obtained by filtering calculations of P0, Q0 pixel points respectively.

Specifically, in an embodiment of the present specification, luminance block boundary when the filtering boundary is a chroma block boundary and the filter strength calculated according to the FS is not 0 (the calculation result of step S333 shown in FIG. 3 is not 0), the obtained filter strength is decremented by 1 as the final filter strength calculation result.

Specifically, in an embodiment of the present specification, the filter pixel group including at least consecutively arranged pixel points P1, P0, Q0, Q1, wherein pixel values are respectively p1, p0, q0, q1, and the filtering boundary passes through between pixel points of P0 and Q0. When filtering calculation of pixel points included in the filter pixel group according to the filter strength, if the filtering boundary is a chroma block boundary and the filter strength is not 0, the filtering calculation is performed based on the following formula:

$$p0'=(p1*3+p0*10+q0*3+8)>>4; \qquad (17)$$

$$q0'=(q1*3+q0*10+p0*3+8)>>4; \qquad (18)$$

In equation 17~Form18, p0', q0' represent new pixel values respectively, which obtained by filtering calculations of P0, Q0 pixel points respectively.

Specifically, in an embodiment of the present specification, the filter pixel group including at least consecutively arranged pixel points P2, P1, P0, Q0, Q1, Q2, wherein pixel values are respectively p2, p1, p0, q0, q1, q2, and the filtering boundary passes through between two pixel points of P0 and Q0. When filtering calculation of pixel points included in the filter pixel group according to the filter strength, if the filtering boundary is a chroma block boundary and the filter strength is 3, the filtering calculation is performed based on the following formula:

$$p1'=(p2*3+p1*8+p0*3+q0*2+8)>>4; \qquad (19)$$

$$q1'=(q2*3+q1*8+q0*3+p0*2+8)>>4; \qquad (20)$$

In equation 19~Form20, p1', q1' represent new pixel values respectively, which obtained by filtering calculations of P1, Q1 pixel points respectively.

It should be noted that, in the above embodiment, when determining the filter is pixel group, only the pixel points that the filter pixel group must contain are limited, but the filter pixel group is not limited to include only those pixel points. In the embodiment of the present specification, the number of pixels in the filter pixel group can be determined according to actual needs. For example, in an embodiment of the present specification, the calculation of the FR, FL, FS, and filter strength can be completed only by filtering 6 pixel points in the pixel group (both sides of the filtering boundary, 3 pixels on each side) immediately adjacent to the filtering boundary. Therefore, the filter pixel group includes at least consecutively arranged the pixel points P2, P1, P0, Q0, Q1, and Q26 pixels. But this is not to say that in all embodiments the filter pixel group contains only these 6 pixels.

Figure 5:
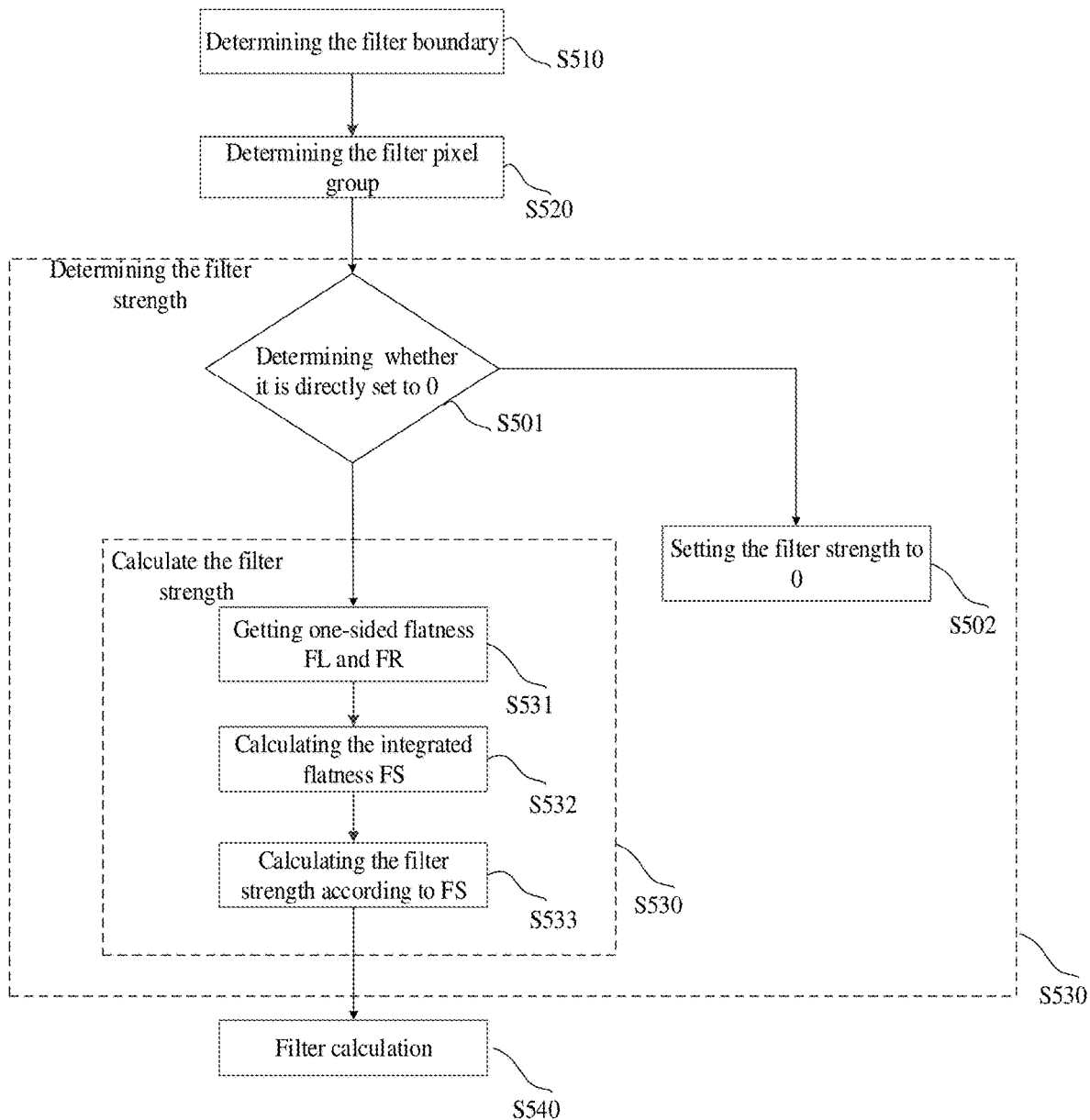

Further, in an embodiment of the present specification, when determining the filter strength of the filter pixel group, the filter strength is not immediately calculated, but first it is determined whether the filter strength needs to be calculated. Specifically, as shown in FIG. 5, in the process of determining the filter strength of the filter pixel group (step S530):

S501, determining whether the filter strength should be set to 0 directly;

S502, when the filter strength should be directly set to 0, the calculation of the filter strength is not performed, and the filter strength is directly set to 0;

S500, the filter strength is calculated when the filter strength should not be directly set to 0, that is, the filter strength is calculated using S531-533.

Further, when the deblocking filter is performed, if the filter strength should be directly set to 0, there is no need to perform filtering calculation on the corresponding filter pixel group (maintaining the filter pixel group original state). Specifically, in an embodiment of the present specification, when determining whether the filter strength should be set to 0 directly, defining the pixel points adjacent to the filtering is boundary in the filter pixel group as P0 and Q0 respectively, determining whether the filter strength should be set to 0 directly according to the encoding information of the encoding unit or the prediction unit where P0 and Q0 are located.

Specifically, in an embodiment of the present specification, when determining whether the filter strength should be set to 0 directly according to the encoding information of the encoding unit or the prediction unit where P0 and Q0 are located, the judgment factors comprising:
- whether all the quantized blocks of the encoding unit where P0 and Q0 are located are all 0 blocks;
- encoding mode of the encoding unit where P0 and Q0 are located;
- reference index and reference frame of the inter prediction unit where P0 and Q0 are located;
- motion vector of the inter prediction unit where P0 and Q0 are located.

Specifically, in an embodiment of the present specification, when determining whether the filter strength should be set to 0 directly according to the encoding information of the encoding unit or the prediction unit where P0 and Q0 are located, when all the following conditions are met, it is determined that the filter strength should be directly set to 0:
- all the quantization blocks of the encoding unit where P0 and Q0 are located are all 0 blocks;
- the prediction mode of the encoding unit where P0 and Q0 are located is not intra prediction;
- the motion of the prediction unit where P0 and Q0 are located is consistent.

Specifically, in an embodiment of the present specification, when both conditions a) and b) are satisfied or both conditions c) and d) are satisfied, it is considered that the motion of the prediction unit where P0 and Q0 are located is consistent:
- a) the first reference image of the prediction unit where P0 and Q0 are located does not exist, or both of the first reference index values are the same and the difference of all components of the first motion vector is less than one integer pixel;
- b) the second reference image of the prediction unit where P0 and Q0 are located does not exist, or both of the second reference index values are the same and the difference of all components of the second motion vector is less than one integer pixel;
- c) the first reference image of the prediction unit where P0 is located and the second reference image of the prediction unit where Q0 is located do not exist, or the same frame and the difference between the first motion vector of the prediction unit where P0 is located and the second motion vector of the prediction unit where Q0 is located are less than one integer pixel;
- d) the first reference image of the prediction unit where Q0 is located and the second reference image of the prediction unit where P0 is located are not present, or are the same frame and the first motion vector of the prediction unit where Q0 is located and all components of the second motion vector of the prediction unit where P0 is located the difference is less than one integer pixel.

Further, based on the deblocking filter method proposed in the embodiment of the present specification, a video encoding method is also proposed in the up embodiment of the present specification. Specifically, in an embodiment of the present specification, the video encoding methods include:
- getting predicted image blocks;
- acquiring a first residual image block according to the predicted image block and the original image block;
- generating a quantized block for writing a code stream by transforming and quantizing according to the first residual image block;
- generating a second residual image block by inverse quantization and inverse transform according to the quantized block;
- acquiring a reconstructed image block according to the second residual image block and the predicted image block;
- performing a deblocking filter on the reconstructed image formed by the reconstructed image block by using a method as described in the embodiment of the present specification to obtain a reference image for subsequent frame reference.

Specifically, in a specific application scenario, the image is first divided into encoding units of different sizes, and an encoding process is performed for each encoding unit. The encoding unit is used as a prediction unit for prediction, and the prediction mode can select an optimal mode from the intra prediction mode and the inter prediction mode. If it is the inter prediction mode, it is also necessary to acquire the first and/or second reference frame indexes of the prediction unit, and the first and/or second motion vectors, and generate a prediction image block PRED according to the above prediction information. Then, using the encoding unit as a transform unit, the predicted image block PRED is subtracted from the original image block ORG to generate a residual image block RESI. Transforming and quantizing the residual image block to obtain a quantized block. At this time, information such as a quantization block, an encoding mode, a reference frame index, to and a motion vector can be written in the code stream for decoding by the decoding end. The reconstructed image block RECO is obtained by the residual image block RESI' and the predicted image block PRED. The deblocking filter method according to the embodiment of the present specification performs a deblocking filter operation on the reconstructed image block RECO to obtain a reference image for subsequent is frame encoding reference.

Further, the video decoding method is also proposed in the embodiment of the present specification based on the deblocking filter method proposed in the embodiment of the present specification. Specifically, in an embodiment of the present specification, the video decoding method includes:
- parsing the code stream to obtain quantized blocks and prediction information;
- obtaining a predicted image block according to the prediction information;
- acquiring a residual image block according to the quantized block;
- acquiring a reconstructed image block according to the residual image block and the predicted image block;
- performing a deblocking filter on the reconstructed image formed by the reconstructed image block by using a method as described in the embodiment of the present specification to obtain a reference image for subsequent frame reference.

Specifically, in a specific application scenario, parsing the code stream to obtain prediction modes, reference frame indexes, motion vectors, quantization blocks, and the like for each encoding unit. A predictive image block PRED can be generated based on information such as prediction mode, reference frame index, motion vector, and the like. Performing inverse quantization and inverse transform operations on the quantized block to obtain a residual image block RESI'. The reconstructed image block RECO can be obtained by the residual image block RESI' and the predicted image block PRED. The deblocking filter method according to the embodiment of to the present specification performs a deblocking filter operation on the reconstructed image composed of the reconstructed image block to obtain a reference image for subsequent frame decoding reference.

Figure 6:
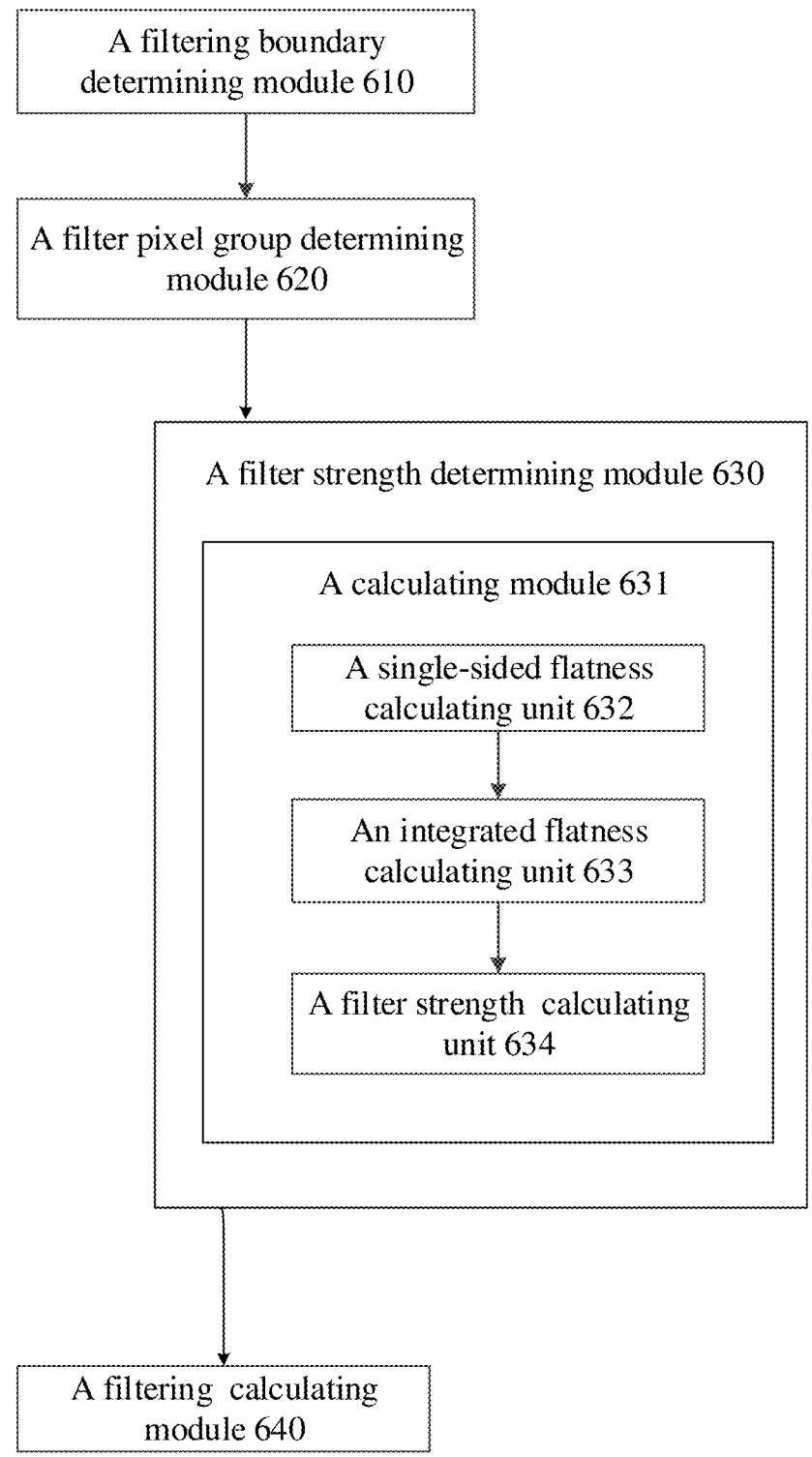
FIGS. 6 and 7 are system block diagrams according to embodiments of the present specification.

Further, the deblocking filter system is also proposed in the embodiment of the present specification based on the deblocking filter method proposed in the is embodiment of the present specification. Specifically, as shown in FIG. 6, the system comprises:

a filtering boundary determining module 610, configured to determine a filtering boundary;

a filter pixel group determining module 620, configured to determine a filter pixel group based on the filtering boundary;

a filter strength determining module 630, configured to determine a filter strength of the filter pixel group, the filter strength determining module 630 includes a calculating module 631, and the calculating module 631 includes:

a single-sided flatness calculating unit 632, configured to respectively parse pixel value difference states of pixel points on both sides of the filtering boundary in the filter pixel group to obtain two one-sided flatness FL and FR;

an integrated flatness calculating unit 633, configured to calculate an integrated flatness FS of the filter pixel group, wherein FS=FL+FR;

a filter strength calculating unit 634, configured to calculate the filter strength according to FS;

a filter calculating module 640, configured to perform filtering calculation on pixel points included in the filter pixel group according to the filter strength.

Figure 7:
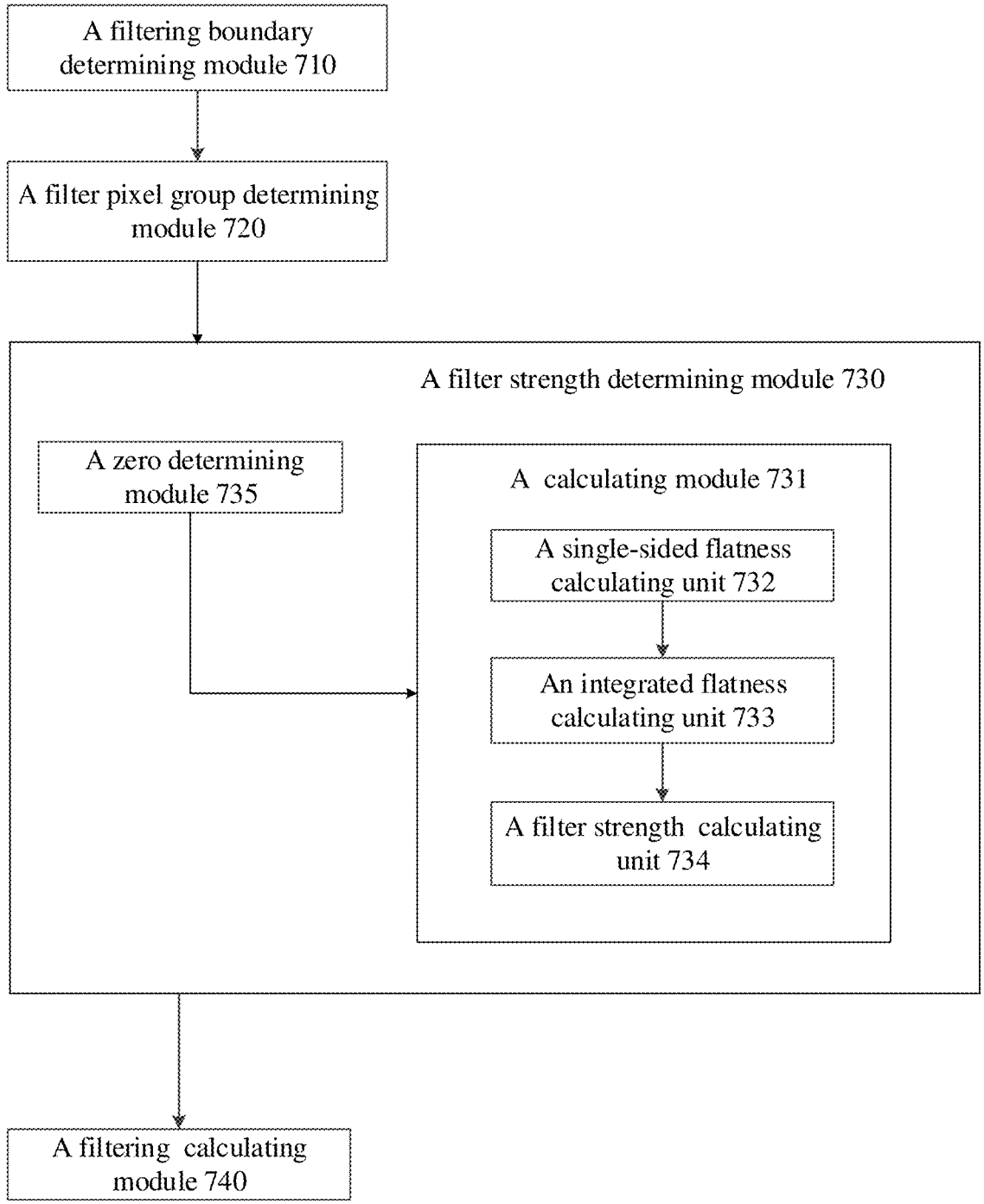

Further, in an embodiment of the present specification, as shown in FIG. 7, the filter strength determining module 730 further includes a 0 determining module 735 configured to determine whether the filter strength should be directly set to 0. The filter strength determining module 730 is configured to: when the 0 determining module 735 determines that the filter strength should be directly set to 0, the filter strength determining module 730 directly sets the filter strength to 0; when the 0 determining module 735 determines that the filter strength should not be directly set at 0 o'clock, the filter strength determining module 730 calculates the filter strength is using the calculating module 731.

Based on the method of the embodiments of the present specification, the embodiment of the present specification further proposes a computer readable medium, the computer-readable medium with computer readable instructions that can be executed by a processor to perform the method of the embodiments of the present specification.

Based on the method of the embodiments of the present specification, Embodiment of the present specification further provides a device used for information processing at the user side, wherein the device includes a memory for storing computer program instructions and a processor for executing program instructions, and the device is triggered to perform the method of the embodiments of the present specification when the computer program instructions are executed by the processor.

In the 1990s, it was easy to identify improvements to a technology were whether improvements to hardware (for example, improvements to circuit structures such as diodes, transistors, switches, etc.) or improvements to software (improvements to process flow). However, with the development of technology, many of the improvements to process may now be considered as direct improvements to the hardware (such as circuit structure). Designers always get corresponding hardware circuit structure by programming the improved process into the hardware circuit. Therefore, it's hard to say that an improvement of process cannot be implemented with hardware entity modules. For example, a Programmable Logic Device (PLD) (such as a Field Programmable Gate Array (FPGA)) is an integrated circuit and its logic function is determined by programming the device by users. Designers programmatically "integrate" a digital system onto a single PLD without designing and fabricating a dedicated integrated circuit chip by a chip manufacturer. Moreover, is today, instead of manually manufacturing integrated circuit chips, the programming process is mostly implemented using a software as "logic compiler", which is similar to the software compiler used in program development process, and the original code to be compiled also needs to be written in a specific programming language called Hardware Description Language (HDL), and there are more than one kind of HDLs, such as BEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc., wherein VHDL (Very-High-Speed Integrated Circuit Hardware Description Language) and Verilog are the most commonly used. It should also be clear to those skilled in the art that, the hardware circuit that implements the logic process flow may be easily got only using above hardware description languages to logically program the process and to program the process into the integrated circuit.

A controller may be implemented in any suitable manner, for example, the controller may take a form of, for example, a microprocessor or a processor, a computer readable medium storing the computer readable program code (for example, software or firmware) executable by the (micro) processor, logic gates, switches, Application Specific Integrated Circuit (ASIC), programmable logic controllers and embedded microcontrollers, and examples of the controllers include but not limited to the following microcontrollers: ARC 625D, Atmel AT91SAM, Microchip PIC18F26K20 and Silicone Labs C8051F320, and a memory controller may also be implemented as a part of the control logic of a memory. It is known to those skilled in the art that, in addition to implement the controller by the way of purely computer readable program code, it is entirely possible to implement the same function in a form of logic gates, switches, Application Specific Integrated Circuit is (ASIC), programmable logic controllers, embedded microcontrollers, etc., by logically programming the method steps. Therefore, such a controller may be considered as a hardware component, and apparatuses included therein for implementing various functions may also be regarded as structures within the hardware component. Or even, apparatuses used to implement various functions may be regarded as software modules of implementation method and structures within the hardware component.

The system, apparatus, module or unit illustrated in the above embodiments may be implemented by a computer chip or an entity, or by a product with a certain function. A typical implementation device is a computer. Specifically, the computer may be, for example, a personal computer, a laptop, a cellular phone, a camera phone, a smart phone, a personal digital assistant, a media player, a navigation device, an email device, a gaming console, a tablet, a wearable device, or a combination of any devices from above.

For the convenience of description, the above apparatuses are described as different units according to the functions thereof respectively. Of course, when one or more embodiments of the specification are implemented, the functions of the units may be implemented in one or more software and/or hardware.

Those skilled in the art will understand that an embodiment of the specification may be provided as method, system or products of computer programs. Therefore, an embodiment of the specification may take the form of an entirely hardware embodiment, an entirely software embodiment, or an embodiment combining software and hardware. Also, an embodiment of the specification may take the form of a product of computer program embodied on one or more computer usable storage media (including but not limited to disk storage, CD-ROM, optical storage, etc.) having computer usable program code embodied therein.

The present description is described in terms of flowcharts and/or block diagrams of a methods, devices (systems), and computer program products according to embodiments of the specification. It should be understood that each flow and/or block of the flowcharts and/or block diagrams, and combinations of flows and/or blocks in the flowcharts and/or block diagrams may be implemented by computer program instructions. These computer program instructions may be provided to a processor of a general purpose computer, a special purpose computer, an embedded processor, or other programmable data processing device to produce a machine, and thus, instructions executed by a processor of a computer or other programmable data processing device generate devices for implementing the functions specified in one flow or more flows of the flowcharts or one block or more blocks of the block diagrams.

The computer program instructions may also be stored in a computer readable memory that may direct a computer or other programmable data processing device to operate in a particular manner, such that the instructions stored in the computer readable memory produce an article of manufacture comprising an instruction device that implements the functions specified in a flow or more flows in flowcharts and/or a block or more blocks in block diagrams.

These computer program instructions may also be loaded onto a computer or other programmable data processing device such that a series of operational steps are performed on a computer or other programmable devices to produce computer-implemented processing, and therefore instructions executed on a computer or other programmable device provide steps for implementing the functions specified in a flow or more flows in flowcharts and/or a block or more blocks in block diagrams.

In a typical configuration, the computing device includes one or more processors (CPUs), input/output interfaces, network interfaces, and memory.

The memory may include a form of a non-persistent memory, a random access memory (RAM), and/or a non-volatile memory in a computer readable medium, such as a read-only memory (ROM) or a flash memory (Flash RAM). Memory is an example of a computer readable medium.

The computer readable medium includes both permanent and non-permanent media, removable and non-removable media, and the information may be stored by any method or technology. Information may be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read only memory (ROM), electrically erasable programmable read only memory (EEPROM), flash memory or other memory technology, compact disc-read only memory (CD-ROM), digital versatile disk (DVD) or other optical storage, magnetic tape cartridges, magnetic tape storage or other magnetic storage devices or any other non-transportable media that may be used to store information that may be accessed by a computing device. As defined herein, the computer readable media does not include transitory media, such as modulated data signals and carrier waves.

It should also be noted that the terms "comprise" or "include" or any other variations thereof are intended to encompass a non-exclusive inclusion, lead to a process, a method, a commodity, or a device including a series of elements includes not only those elements but also other elements not explicitly listed, or inherent in the process, the method, the commodity, or the device. Without more restrictions, elements defined by the phrase "include/comprise a . . . " do not exclude the presence of additional identical elements in the process, the method, the commodity, or the device including the elements.

This description may be described in the general context of computer-executable instructions executed by a computer, such as a program module. Generally, program modules include routines, programs, objects, components, data structures, and the like that perform particular tasks or implement particular abstract data types. It is also possible to implement the specification in a distributed computing environment in which tasks are performed by remote processing devices that are connected through a communication network.

The various embodiments in the specification are described in a progressive manner, and the same or similar parts between the various embodiments may be referred to each other, and each embodiment focuses on the differences from other embodiments. In particular, for the system embodiment, since it is basically similar to the method embodiment, the description is relatively simple, and the corresponding parts may refer to the description of the method embodiment.

The aspects described above are only for the embodiments of the specification, and are not intended to limit this application. Various changes and variations may be made to the application by those skilled in the art. Any modifications, equivalents, improvements, etc. made within the spirit and principles of the present application are intended to be included within the scope of the claims of the present application.

We claim:

1. A method for deblocking filter, comprising:
    determining a filtering boundary, and then determining a filter pixel group based on the filtering boundary;
    determining a filter strength of the filter pixel group, comprising: calculating step, the calculating step comprising:
        parsing separately a pixel value difference states of pixel points on both sides of the filtering boundary in the filter pixel group to obtain two one-sided flatness FL and FR;

calculating a comprehensive flatness FS of the filter pixel group, wherein FS=FL+FR;
calculating the filter strength according to FS;
filtering calculation of pixel points included in the filter pixel group according to the filter strength.

2. The method of claim 1,
when determining a filter pixel group, the filter pixel group including at least consecutively arranged pixel points P2, P1, P0, Q0, Q1, and Q2, wherein pixel values are respectively p2, p1, p0, q0, q1, and q2, and the filtering boundary passes through between pixel points of P0 and Q0;
obtaining two one-sided flatness FL and FR, comprising:
calculating an average quantization parameter according to a quantization parameter of an encoding unit where P0 and Q0 are located, calculating thresholds A and B according to the average quantization parameter, and initializing FL and FR to 0, respectively Calculate FL and FR, where:
if abs(p0−p1)<B, the value of FL is increased by 2;
if abs(q0−q1)<B, the value of FR is increased by 2;
if abs(p0−p2)<B, the value of FL is increased by 1;
if abs(q0−q2)<B, the value of FR is increased by 1;
calculating the filter strength according to FS, wherein:
when FS is 6, if abs(p0−p1)≤B/4, and abs(q0−q1)≤B/4, and abs(p0−q0)<A, the filter strength is 4, otherwise 3;
when FS is 5, if p0 is equal to p1, and q0 is equal to q1, the filter strength is 3, otherwise 2;
when FS is 4, if the value of FL is 2, the filter strength BS is 2, otherwise it is 1;
when FS is 3, if abs(p1−q1)<B, the filter strength is 1, otherwise 0;
when FS is other than 3~6, the filter strength is 0.

3. The method of claim 2, wherein calculating thresholds A and B based on the average quantization parameter, comprising:
obtaining initial values of the thresholds A and B according to the average quantization parameter query based on the preset table;
the initial values of a thresholds A and B are adjusted according to a pixel value bit width, and the final values of a thresholds A and B are obtained.

4. The method of claim 3, when the initial values of a thresholds A and B are adjusted according to a pixel value bit width, wherein the initial value is adjusted based on the following formula:

$$A=A<<(BD-8);$$

$$B=B<<(BD-8);$$

in the above formula, BD is a pixel value bit width.

5. The method of claim 1,
when determining a filter pixel group, the filter pixel group including at least consecutively arranged pixel points P3, P2, P1, P0, Q0, Q1, Q2, and Q3, wherein pixel values are respectively p3, p2, p1, p0, q0, q1, q2, and q3, and the filtering boundary passes through between two pixel points of P0 and Q0;
when filtering calculation of pixel points included in the filter pixel group according to the filter strength, if the filtering boundary is a luminance block boundary and the filter strength is 4, the filtering calculation is performed based on the following formula:

$$p0'=(p2*3+p1*8+p0*10+q0*8+q1*3+16)>>5;$$

$$q0'=(q2*3+q1*8+q0*10+p0*8+p1*3+16)>>5;$$

$$p1'=(p2*4+p1*5+p0*4+q0*3+8)>>4;$$

$$q1'=(q2*4+q1*5+q0*4+p0*3+8)>>4;$$

$$p2'=(p3*2+p2*2+p1*2+p0+q0+4)>>3;$$

$$q2'=(q3*2+q2*2+q1*2+q0+p0+4)>>3;$$

in the above formula, p2', p1', p0', q0', q1', q2' represent new pixel values respectively, which obtained by filtering calculations of P2, P1, P0, Q0, Q1, and Q2 pixel points.

6. The method of claim 1,
when determining the filter pixel group, the filter pixel group including at least consecutively arranged pixel points P2, P1, P0, Q0, Q1, Q2, wherein pixel values are respectively p2, p1, p0, q0, q1, q2, and the filtering boundary passes through between pixel points of P0 and Q0;
when filtering calculation of pixel points included in the filter pixel group according to the filter strength, if the filtering boundary is a luminance block boundary and the filter strength is 3, the filtering calculation is performed based on the following formula:

$$p0'=(p2+p1*4+p0*6+q0*4+q1+8)>>4;$$

$$q0'=(q2+q1*4+q0*6+p0*4+p1+8)>>4;$$

$$q1'=(p2*3+p1*8+p0*4+q0*1+8)>>4;$$

$$q1'=(q2*3+q1*8+q0*4+p0*1+8)>>4;$$

in the above formula, p1', p0', q0', q1' represent new pixel values respectively, which obtained by filtering calculations of P1, P0, Q0, Q1 pixel points respectively.

7. The method of claim 1,
when determining the filter pixel group, the filter pixel group including at least consecutively arranged pixel points P1, P0, Q0, Q1, wherein pixel values are respectively p1, p0, q0, q1, and the filtering boundary passes through between pixel points of P0 and Q0;
when filtering calculation of pixel points included in the filter pixel group according to the filter strength, if the filtering boundary is a luminance block boundary and the filter strength is 2, the filtering calculation is performed based on the following formula:

$$p0'=(p1*3+p0*10+q0*3+8)>>4;$$

$$q0'=(q1*3+q0*10+p0*3+8)>>4;$$

in the above formula, p0', q0' represent new pixel values respectively, which obtained by filtering calculations of P0, Q0 pixel points respectively.

8. The method of claim 1,
when determining the filter pixel group, the filter pixel group including at least consecutively arranged pixel points P0, Q0, wherein pixel values are respectively p0, q0, and the filtering boundary passes through between pixel points of P0 and Q0;
when filtering calculation of pixel points included in the filter pixel group according to the filter strength, if the filtering boundary is a luminance block boundary and the filter strength is 1, the filtering calculation is performed based on the following formula:

$$p0'=(p0*3+q0+2)>>2;$$

$$q0'=(q0*3+p0+2)>>2;$$

in the above formula, p0', q0' represent new pixel values respectively, which obtained by filtering calculations of P0, Q0 pixel points respectively.

9. The method of claim 1, calculating the filter strength further comprising:
when the filtering boundary is a chroma block boundary and the filter strength calculated in the step of calculating the filter strength according to the FS is not 0, the filter strength calculated in the step of calculating the filter strength according to the FS is decremented by one, as a final filter strength calculation result.

10. The method of claim 9,
when determining the filter pixel group, the filter pixel group including at least consecutively arranged pixel points P1, P0, Q0, Q1, wherein pixel values are respectively p1, p0, q0, q1, and the filtering boundary passes through between pixel points of P0 and Q0;
when filtering calculation of pixel points included in the filter pixel group according to the filter strength, if the filtering boundary is a chroma block boundary and the filter strength is not 0, the filtering calculation is performed based on the following formula:

$$p0'=(p1*3+p0*10+q0*3+8)>>4;$$

$$q0'=(q1*3+q0*10+p0*3+8)>>4;$$

in the above formula, p0', q0' represent new pixel values respectively, which obtained by filtering calculations of P0, Q0 pixel points respectively.

11. The method of claim 9,
when determining the filter pixel group, the filter pixel group including at least consecutively arranged pixel points P2, P1, P0, Q0, Q1, Q2, wherein pixel values are respectively p2, p1, p0, q0, q1, q2, and the filtering boundary passes through between two pixel points of P0 and Q0;
when filtering calculation of pixel points included in the filter pixel group according to the filter strength, if the filtering boundary is a chroma block boundary and the filter strength is 3, the filtering calculation is performed based on the following formula:

$$p1'=(p2*3+p1*8+p0*3+q0*2+8)>>4;$$

$$q1'=(q2*3+q1*8+q0*3+p0*2+8)>>4;$$

in the above formula, p1', q1' represent new pixel values respectively, which obtained by filtering calculations of P1, Q1 pixel points respectively.

12. The method of claim 1, determining the filter strength of the filter pixel group further comprising:
determining whether the filter strength should be set to 0 directly;
Performing the calculation step when the filter strength should not be set to 0.

13. The method of claim 12, determining whether the filter strength should be set to 0 directly, wherein, defining the pixel points adjacent to the filtering boundary in the filter pixel group as P0 and Q0 respectively, determining whether the filter strength should be set to 0 directly according to the encoding information of the encoding unit or the prediction unit where P0 and Q0 are located.

14. The method of claim 13, determining whether the filter strength should be set to 0 directly according to the encoding information of the encoding unit or the prediction unit where P0 and Q0 are located, among them, the judgment factors comprising:
whether all the quantized blocks of the encoding unit where P0 and Q0 are located are all 0 blocks;
encoding mode of the encoding unit where P0 and Q0 are located;
reference index and reference frame of the inter prediction unit where P0 and Q0 are located;
motion vector of the inter prediction unit where P0 and Q0 are located.

15. The method of claim 13, determining whether the filter strength should be set to 0 directly according to the encoding information of the encoding unit or the prediction unit where P0 and Q0 are located, wherein, when all the following conditions are met, it is determined that the filter strength should be directly set to 0:
all the quantization blocks of the encoding unit where P0 and Q0 are located are all 0 blocks;
the prediction mode of the encoding unit where P0 and Q0 are located is not intra prediction;
the motion of the prediction unit where P0 and Q0 are located is consistent.

16. The method of claim 15, when both conditions a) and b) are satisfied or both conditions c) and d) are satisfied, it is considered that the motion of the prediction unit where P0 and Q0 are located is consistent:
a) the first reference image of the prediction unit where P0 and Q0 are located does not exist, or both of the first reference index values are the same and the difference of all components of the first motion vector is less than one integer pixel;
b) the second reference image of the prediction unit where P0 and Q0 are located does not exist, or both of the second reference index values are the same and the difference of all components of the second motion vector is less than one integer pixel;
c) the first reference image of the prediction unit where P0 is located and the second reference image of the prediction unit where Q0 is located do not exist, or the same frame and the difference between the first motion vector of the prediction unit where P0 is located and the second motion vector of the prediction unit where Q0 is located are less than one integer pixel;
d) the first reference image of the prediction unit where Q0 is located and the second reference image of the prediction unit where P0 is located are not present, or are the same frame and the first motion vector of the prediction unit where Q0 is located and all components of the second motion vector of the prediction unit where P0 is located the difference is less than one integer pixel.

17. A video encoding method, the method comprising:
getting predicted image blocks;
acquiring a first residual image block according to the predicted image block and the original image block;
generating a quantized block for writing a code stream by transforming and quantizing according to the first residual image block;
generating a second residual image block by inverse quantization and inverse transform according to the quantized block;
acquiring a reconstructed image block according to the second residual image block and the predicted image block;
performing a deblocking filter on the reconstructed image formed by the reconstructed image block by using a method as described in the embodiment of the present specification to obtain a reference image for subsequent frame reference;

performing a deblocking filter operation on the reconstructed image composed of the reconstructed image block to acquire a reference image for subsequent frame reference, comprising:

determining a filtering boundary, and then determining a filter pixel group based on the filtering boundary;

determining a filter strength of the filter pixel group, comprising: calculating step, the calculating step comprising:

parsing separately a pixel value difference states of pixel points on both sides of the filtering boundary in the filter pixel group to obtain two one-sided flatness FL and FR;

calculating a comprehensive flatness FS of the filter pixel group, wherein FS=FL+FR;

calculating the filter strength according to FS;

filtering calculation of pixel points included in the filter pixel group according to the filter strength.

18. A video decoding method, the method comprising:

parsing the code stream to obtain quantized blocks and prediction information;

obtaining a predicted image block according to the prediction information;

acquiring a residual image block according to the quantized block;

acquiring a reconstructed image block according to the residual image block and the predicted image block;

the reconstructed image composed of the reconstructed image block is subjected to deblocking filter to acquire a reference image for subsequent frame reference, comprising:

determining a filtering boundary, and then determining a filter pixel group based on the filtering boundary;

determining a filter strength of the filter pixel group, comprising: calculating step, the calculating step comprising:

parsing separately a pixel value difference states of pixel points on both sides of the filtering boundary in the filter pixel group to obtain two one-sided flatness FL and FR;

calculating a comprehensive flatness FS of the filter pixel group, wherein FS=FL+FR;

calculating the filter strength according to FS;

filtering calculation of pixel points included in the filter pixel group according to the filter strength.

19. A deblocking filter system, the system comprising:

a filtering boundary determining module, configured to determine a filtering boundary;

a filter pixel group determining module, configured to determine a filter pixel group based on the filtering boundary;

a filter strength determining module, configured to determine a filter strength of the filter pixel group, the filter strength determining module includes a calculating module, and the calculating module includes:

a single-sided flatness calculating unit, configured to respectively parse pixel value difference states of pixel points on both sides of the filtering boundary in the filter pixel group to obtain two one-sided flatness FL and FR;

An integrated flatness calculating unit, configured to calculate an integrated flatness FS of the filter pixel group, wherein FS=FL+FR;

a filter strength calculating unit, configured to calculate the filter strength according to FS;

a filter calculating module, configured to perform filtering calculation on pixel points included in the filter pixel group according to the filter strength.

20. A non-transitory computer-readable medium with computer readable instructions that can be executed by a processor to perform:

determining a filtering boundary, and then determining a filter pixel group based on the filtering boundary;

determining a filter strength of the filter pixel group, comprising: calculating step, the calculating step comprising:

parsing separately a pixel value difference states of pixel points on both sides of the filtering boundary in the filter pixel group to obtain two one-sided flatness FL and FR;

calculating a comprehensive flatness FS of the filter pixel group, wherein FS=FL+FR;

calculating the filter strength according to FS;

filtering calculation of pixel points included in the filter pixel group according to the filter strength.

21. A device used for information processing at the user side, wherein the device includes a memory for storing computer program instructions and a processor for executing program instructions, and when the computer program instructions are executed by the processor, the device is triggered to perform:

determining a filtering boundary, and then determining a filter pixel group based on the filtering boundary;

determining a filter strength of the filter pixel group, comprising: calculating step, the calculating step comprising:

parsing separately a pixel value difference states of pixel points on both sides of the filtering boundary in the filter pixel group to obtain two one-sided flatness FL and FR;

calculating a comprehensive flatness FS of the filter pixel group, wherein FS=FL+FR;

calculating the filter strength according to FS;

filtering calculation of pixel points included in the filter pixel group according to the filter strength.

\* \* \* \* \*